United States Patent
Young et al.

(10) Patent No.: US 8,059,702 B2
(45) Date of Patent: Nov. 15, 2011

(54) MONITORING MULTIPLE MODEM TRANSMISSION IN A COMMUNICATION DEVICE

(75) Inventors: Jason T. Young, Palm City, FL (US); Dhiraj Gandhi, Plantation, FL (US); Roberto Gautier, Davie, FL (US); Robert A. Hartman, Cooper City, FL (US); David R. Heeschen, Coral Springs, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 1016 days.

(21) Appl. No.: 11/686,351

(22) Filed: Mar. 14, 2007

(65) Prior Publication Data

US 2008/0130727 A1 Jun. 5, 2008

Related U.S. Application Data

(60) Provisional application No. 60/868,045, filed on Nov. 30, 2006.

(51) Int. Cl.
*H04B 1/38* (2006.01)
(52) U.S. Cl. ...................................... 375/222
(58) Field of Classification Search ................ 375/222, 375/224, 356; 455/522; 370/252, 468
See application file for complete search history.

(56) References Cited

U.S. PATENT DOCUMENTS

| | | | |
|---|---|---|---|
| 3,852,669 A | 12/1974 | Bowman et al. | |
| 4,353,037 A | 10/1982 | Miller | |
| 5,043,672 A | 8/1991 | Youn | |
| 5,204,643 A | 4/1993 | Verronen | |
| 5,235,188 A | 8/1993 | Mul | |
| 5,468,684 A | 11/1995 | Yoshimori et al. | |
| 5,524,275 A | 6/1996 | Lindell | |
| 5,682,404 A * | 10/1997 | Miller | 375/222 |
| 5,884,149 A | 3/1999 | Jaakola | |
| 5,946,619 A | 8/1999 | Kolev | |
| 6,064,857 A | 5/2000 | Wiedeman et al. | |
| 6,067,449 A | 5/2000 | Jager | |
| 6,141,706 A | 10/2000 | Thornton et al. | |
| 6,151,509 A | 11/2000 | Chorey | |
| 6,192,230 B1 | 2/2001 | van Bokhorst et al. | |

(Continued)

FOREIGN PATENT DOCUMENTS

WO  0180445 A2  10/2001

(Continued)

OTHER PUBLICATIONS

Young, Declaration of Prior Art Reference, Dated Feb. 6, 2007, 2 pgs.

(Continued)

*Primary Examiner* — David C. Payne
*Assistant Examiner* — Leon-Viet Nguyen (57) ABSTRACT

Within a communication device, a method of managing a plurality of modems can include determining a first measure of transmission power for a first modem (710), wherein the first measure of transmission power is a running total of transmission power for the first modem over a predetermined time period, and determining a second measure of transmission power for a second modem (715), wherein the second measure of transmission power is a running total of transmission power for the second modem over the predetermined time period. If a sum of the first measure of transmission power and the second measure of transmission power exceeds a threshold during the predetermined time period, at least one predetermined action can be performed (725, 730).

17 Claims, 3 Drawing Sheets

U.S. PATENT DOCUMENTS

| | | |
|---|---|---|
| 6,304,748 B1 | 10/2001 | Li et al. |
| 6,549,625 B1 | 4/2003 | Rautila et al. |
| 6,668,175 B1 | 12/2003 | Almgren et al. |
| 6,697,953 B1 | 2/2004 | Collins |
| 6,710,651 B2 | 3/2004 | Forrester |
| 6,744,743 B2 | 6/2004 | Walton et al. |
| 6,744,813 B1* | 6/2004 | Ko et al. ............ 375/224 |
| 6,845,246 B1 | 1/2005 | Steer |
| 6,909,708 B1 | 6/2005 | Krishnaswamy et al. |
| 6,960,956 B2 | 11/2005 | Pehlke et al. |
| 6,985,113 B2 | 1/2006 | Nishimura et al. |
| 6,987,986 B2 | 1/2006 | Boesen |
| 7,069,043 B2 | 6/2006 | Sawamura et al. |
| 7,133,419 B1* | 11/2006 | Hendrichs et al. ............ 370/468 |
| 7,134,029 B2 | 11/2006 | Hepner et al. |
| 7,148,748 B2 | 12/2006 | Apel |
| 7,187,663 B2 | 3/2007 | Schmidt |
| 7,221,955 B2 | 5/2007 | Chen et al. |
| 7,280,505 B2 | 10/2007 | Chaskar et al. |
| 7,486,975 B2 | 2/2009 | Mori |
| 7,525,261 B2 | 4/2009 | van Zundert et al. |
| 7,633,898 B2 | 12/2009 | Jain et al. |
| 2002/0101907 A1 | 8/2002 | Dent et al. |
| 2002/0142791 A1 | 10/2002 | Chen et al. |
| 2003/0078037 A1 | 4/2003 | Auckland et al. |
| 2003/0123425 A1 | 7/2003 | Walton et al. |
| 2003/0149904 A1 | 8/2003 | Kim |
| 2003/0157954 A1 | 8/2003 | Medvedev et al. |
| 2003/0208601 A1 | 11/2003 | Campbell et al. |
| 2003/0228875 A1 | 12/2003 | Alapuranen |
| 2004/0108895 A1 | 6/2004 | Wu et al. |
| 2004/0142715 A1 | 7/2004 | Oses |
| 2004/0176125 A1 | 9/2004 | Lee |
| 2004/0204181 A1 | 10/2004 | Cromer et al. |
| 2005/0075123 A1 | 4/2005 | Jin et al. |
| 2005/0195787 A1 | 9/2005 | Madour et al. |
| 2005/0201321 A1 | 9/2005 | Sinnarajah et al. |
| 2005/0215206 A1 | 9/2005 | Granstrom et al. |
| 2005/0240786 A1 | 10/2005 | Ranganathan |
| 2005/0242879 A1 | 11/2005 | Muller |
| 2005/0272382 A1 | 12/2005 | Amano |
| 2006/0003793 A1* | 1/2006 | Ngai et al. ............ 455/522 |
| 2006/0067245 A1 | 3/2006 | Pearl |
| 2006/0084395 A1 | 4/2006 | Kezys et al. |
| 2006/0194540 A1 | 8/2006 | Hunzinger et al. |
| 2006/0223577 A1 | 10/2006 | Ouzillou |
| 2006/0229029 A1 | 10/2006 | Waltho et al. |
| 2007/0014260 A1 | 1/2007 | Seo |
| 2007/0030063 A1 | 2/2007 | Izumi et al. |
| 2007/0042775 A1 | 2/2007 | Umatt et al. |
| 2007/0049239 A1 | 3/2007 | Joung et al. |
| 2007/0111681 A1 | 5/2007 | Alberth et al. |
| 2007/0135154 A1 | 6/2007 | Gautier et al. |
| 2007/0285247 A1 | 12/2007 | Forster |
| 2007/0298835 A1 | 12/2007 | Uehara et al. |
| 2008/0053207 A1 | 3/2008 | Burgan et al. |
| 2008/0062912 A1 | 3/2008 | Tiedemann, Jr. et al. |
| 2008/0102874 A1 | 5/2008 | Gautier et al. |
| 2008/0118014 A1* | 5/2008 | Reunamaki et al. .......... 375/356 |
| 2008/0130728 A1 | 6/2008 | Burgan et al. |
| 2008/0146268 A1 | 6/2008 | Gandhi et al. |
| 2009/0296794 A1* | 12/2009 | Min et al. ............ 375/222 |

FOREIGN PATENT DOCUMENTS

| | | |
|---|---|---|
| WO | 2005084057 A1 | 9/2005 |
| WO | 2008067189 A2 | 6/2008 |

OTHER PUBLICATIONS

United States Patent & Trademark Office, "Non-Final Rejection" for U.S. Appl. No. 11/610,592, Feb. 24, 2010, 12 pages.

United States Patent & Trademark Office, "Non-Final Rejection" for U.S. Appl. No. 11/467,949, Sep. 3, 2009, 15 pages.

United States Patent & Trademark Office, "Non-Final Rejection" for U.S. Appl. No. 11/553,999, Jul. 9, 2009, 16 pages.

United States Patent & Trademark Office, "Final Rejection" for U.S. Appl. No. 11/533,999, Mar. 29, 2010, 18 pages.

United States Patent & Trademark Office, "Non-Final Rejection" for U.S. Appl. No. 11/426,710, Jun. 10, 2011, 51 pages.

United States Patent & Trademark Office, "Non-Final Rejection" for U.S. Appl. No. 11/686,426, Jan. 25, 2010, 19 pages.

United States Patent & Trademark Office, "Final Rejection" for U.S. Appl. No. 11/686,426, Aug. 2, 2010, 22 pages.

Patent Cooperation Treaty, "PCT Search Report and Written Opinion of the International Searching authority" for International Application PCT/US2007/084906, Jul. 16, 2008, 11 pages.

Korean Intellectual Property Office (KIPO), "Notice of Preliminary Rejection" for Korean Application No. 10-2009-7013580, Feb. 28, 2011, 5 pages.

United States Patent & Trademark Office, "Non-Final Rejection" for U.S. Appl. No. 111273,231, Feb. 16, 2011, 27 pages.

* cited by examiner

MONITORING MULTIPLE MODEM TRANSMISSION IN A COMMUNICATION DEVICE

CROSS REFERENCES TO RELATED APPLICATIONS

This application claims benefit of U.S. provisional patent application Ser. No. 60/868,045, filed Nov. 30, 2006, which is herein incorporated by reference.

BACKGROUND OF THE INVENTION

1. Field of the Invention

The present invention generally relates to communication devices and, more particularly, to communication devices that have a plurality of modems.

2. Background of the Invention

Many modern communication devices incorporate multiple modems to facilitate communication over more than one network. For example, some mobile stations, such as those available from Motorola, Inc. of Schaumburg, Ill., have begun to offer mobile stations capable of communicating over CDMA and iDEN networks. (Motorola and iDEN are trademarks of Motorola, Inc. in the United States, other countries, or both).

Other examples of communication devices having multiple modems can include mobile stations that communicate over mobile phone network(s) as well as over one or more short range wireless networks such as an IEEE 802 wireless network or a Bluetooth® wireless network. Mobile stations typically include Bluetooth modems for communicating with wireless peripheral devices such as earpieces and the like. The various modems within the communication device often operate concurrently and independently of one another. This functionality allows the user to engage in a telephone conversation on the mobile station while also sending or receiving data in one or more other formats. For instance, the user can browse the Internet, communicate data files, and communicate via electronic mail.

Several considerations arise when more than one modem is used concurrently within a mobile station. One consideration is the increased power needed to drive the mobile station. Each additional modem increases the power needed by the device thereby placing a larger burden on the battery. The current draw that occurs when more than one modem is active at the same time can, in some cases, be so significant that the useful life of the battery is reduced.

Another consideration is thermal energy. The use of multiple modems concurrently, particularly in light of the increased transmission rates and longer duty cycles of selected modems, can result in the generation of a significant amount of thermal energy. The thermal energy generated by the mobile station can, in some cases, rapidly deplete the battery.

SUMMARY OF THE INVENTION

The present invention relates to a method of managing a plurality of modems within a communication device. The method can include determining a first measure of transmission power for a first modem, wherein the first measure of transmission power is a running total of transmission power for the first modem over a predetermined time period and determining a second measure of transmission power for a second modem, wherein the second measure of transmission power is a running total of transmission power for the second modem over the predetermined time period. If a sum of the first measure of transmission power and the second measure of transmission power exceeds a threshold during the predetermined time period, at least one predetermined action can be performed.

The method can include calculating the sum of the first measure of transmission power and the second measure of transmission power only according to portions of the predetermined time period during which both the first modem and the second modem transmit concurrently.

Determining the first measure of transmission power can include determining a total amount of time that the first modem transmits during the predetermined time period. The first measure of transmission power can be calculated as a function of the total amount of time for the first modem and a weighting factor that depends upon a type of the first modem. The total amount of time for the first modem can be determined by receiving, from the first modem, transmission status messages indicating when the first modem transmits and calculating the time that the first modem transmits during the predetermined time period according to the transmission status messages.

Determining the second measure of transmission power can include determining a total amount of time that the second modem transmits during the predetermined time period and calculating the second measure of transmission power as a function of the total amount of time for the second modem and a weighting factor that depends upon a type of the second modem. The total amount of time for the second modem can be determined by receiving, from the second modem, transmission status messages indicating when the second modem transmits and calculating the time that the second modem transmits during the predetermined time period according to the transmission status messages.

Performing at least one predetermined action can include discontinuing transmission of at least one of the first modem or the second modem until the expiration of the predetermined time period. Discontinuing transmission of at least one of the first modem or the second modem further can include selecting a modem for which transmission will be discontinued according to an established modem priority. Performing at least one predetermined action also can include preventing at least one of the first modem or the second modem from transmitting until the expiration of the predetermined time period.

The present invention also relates to a communication device. The communication device can include one or more modems and a controller coupled to each of the modems. The controller can selectively implement an action, at least until, the expiration of a predetermined time period if a running total of transmission power for the communication device exceeds a threshold during the predetermined time period.

The controller, in one arrangement, can be disposed within one of the modems. Accordingly, the modem including the controller can function as a master controller over the other modems.

In another arrangement, each of the modems can include a controller. In that case, each controller can regulate only the modem within which that controller is disposed. Each controller can regulate the modem within which it is disposed according to a running total of transmission power for the communication device that is independently determined by each respective controller with respect to the modems over the predetermined time period.

The controller can determine a first measure of transmission power for a first of the modems over the predetermined time period and determine a second measure of transmission power for a second of the modems over the predetermined time period. If a sum of the first measure of transmission power and the second measure of transmission power exceeds a threshold during the predetermined time period, the controller further can perform at least one predetermined action.

In another arrangement, the controller can calculate the sum of the first measure of transmission power and the second measure of transmission power only for portions of the predetermined time period during which both the first modem and the second modem transmit concurrently.

The controller further can determine a running total amount of time that the first modem transmits a signal during the predetermined time period and calculate the first measure of transmission power as a function of the running total amount of time for the first modem and a weighting factor that depends upon modem type of the first modem. The controller also can determine a running total amount of time that the second modem transmits a signal during the predetermined time period and calculate the second measure of transmission power as a function of the running total amount of time for the second modem and a weighting factor that depends upon modem type of the second modem.

The controller can select a modem from the collection of modems of the communication device and allow the selected modem to transmit while preventing or discontinuing transmission of at least one other modem for the remainder of the predetermined time period.

The present invention also relates to a communication device including a first modem, a second modem, and at least one controller coupled to the first modem and the second modem. The controller can monitor the amount of time the first modem and the second modem concurrently transmit and selectively prevent the first modem and the second modem from concurrently transmitting for the remainder of a predetermined time period if a measure of cumulative transmission power over the predetermined time period for both the first modem and the second modem exceeds a threshold.

In one arrangement, the controller can be disposed within the first modem. In another arrangement, the communication device can include an additional controller that can be disposed within the second modem. In that case, the controller in the second modem independently can monitor the amount of time the first modem and the second modem concurrently transmit and selectively prevent the first modem and the second modem from concurrently transmitting for the remainder of a predetermined time period if a measure of cumulative transmission power over the predetermined time period for both the first modem and the second modem exceeds a threshold. The controller in the first modem can control only the first modem and the controller in the second modem can control only the second modem.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to managing and/or controlling modems in a communication device that includes a plurality of modems. Within such a device, the amount of time that each modem is active, or transmitting, within a given time period can be monitored. If the amount of time, which can be adjusted or weighted according to the type of modem that is transmitting, exceeds a threshold amount, one or more predetermined actions can be taken such as discontinuing or preventing transmission from one or more of the modems. In another arrangement, only time that more than one modem is transmitting concurrently is monitored. In any case, monitoring the transmission times of each modem within the mobile station can reduce the thermal energy that is generated by the mobile station as well as increase battery life.

Figure 1:
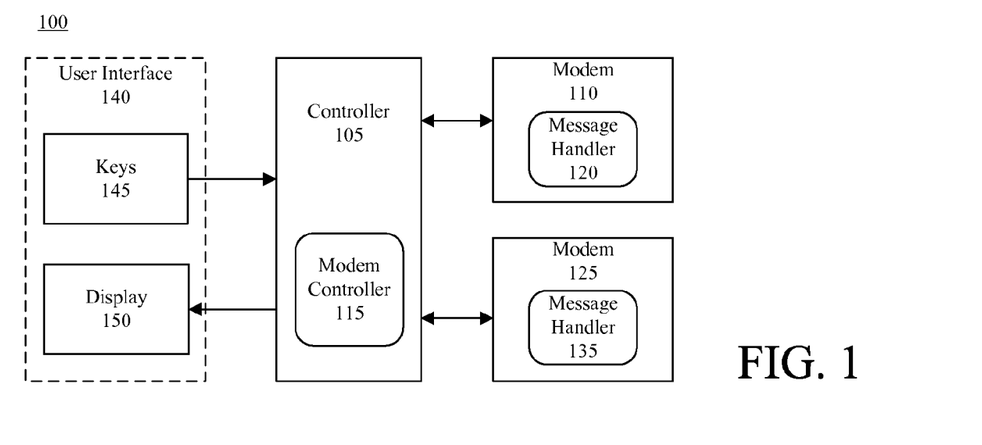
FIG. 1 depicts a communication device that is useful for understanding the present invention.

FIG. 1 depicts a communication device 100 that is useful for understanding the present invention. The communication device 100 can be any of a variety of different devices that have a plurality of modems, i.e., a computer system, a portable information processing system such as a personal digital assistant (PDA), a mobile station, etc. The particular type of communication device is not intended to limit the present invention so long as the communication device includes, and is configured to function with, more than one modem as described herein.

As shown, the communication device 100 can include a controller 105, a modem controller 115, a plurality of modems 110 and 125, and a user interface 140. The controller 105 can comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. These components can be coupled together to perform various processing functions as described herein.

The modems 110 and 125 can modulate and demodulate signals to convert signals from one form to another for transmission over various communication networks (not shown). Each of the modems 110 and 125 can be configured to communicate over a different communication channel or protocol, as the case may be. In one aspect, the modem 110 can communicate data via IEEE 802 wireless communications, for example, 802.11 and 802.16 (WiMax), WPA, or WPA2. The modem 125, for example, can communicate data via GSM, TDMA, CDMA, WCDMA, or direct wireless communication. Though not shown, it should be appreciated that the modems 110 and 125 can include a transceiver, an antenna, memory, a controller, and multiple layers of control software.

Fewer or additional modems can be included within the communication device 100. For example, one or more additional modems can be included which communicate data over short range wireless communication links such as Bluetooth. It should be appreciated that the particular number of modems included within the communication device 100 is not intended to limit the present invention so long as the communication device 100 includes more than one modem. Further, the particular communication networks and protocols listed herein have been provided for purposes of illustration only and are not intended to limit the present invention.

Each of the modems 110 and 125 can include a respective message handler 120 and 135. Each of the message handlers 120 and 135 can be configured to send transmission status messages from the modem to the controller 105 and, more particularly, to the modem controller 115. The transmission status messages indicate when the modem starts transmitting and when the modem stops transmitting. The message handlers 120 and 135 further can receive commands or instructions from the modem controller 115 allowing each respective modem to be controlled by commands or instructions sent from the modem controller 115.

The user interface 140 can include one or more keys 145 which can be disposed within a keypad, one or more programmable keys, or both. A programmable key refers to a key that can be used to initiate any of a variety of different programmatic actions within the communication device 100 according to the particular operating state in which the communication device 100 is disposed at the time the programmable key is actuated or activated. The user interface 140 also can include a display 150. Other mechanisms (not shown) for obtaining user input and providing feedback to a user can be provided in the user interface 140. For example, the communication device 100 can include various sensors, audio input and output transducers, etc.

The communication device 100 further can include a data storage device (not shown). The data storage device can include, but is not limited to, a magnetic storage medium, an electronic storage medium, an optical storage medium, a magneto-optical storage medium, and/or any other storage medium suitable for storing digital information such as program code that, when executed, can cause a processor or controller such as controller 105 to execute one or more of the functions described herein. In one arrangement, the data storage device can be integrated into the controller 105, though this need not be the case.

The modem controller 115 can be implemented as hardware, program code executed by the controller 105, or any combination thereof. The modem controller 115 can communicate with the modems 110 and 125 to determine which of modems 110 and 125, if any, are transmitting, the time that each of the modems 110 and 125 transmits, the time that each of the modems 110 and 120 is inactive, the amount of time that the modems 110 and 120 transmit concurrently, i.e., in an overlapping fashion, etc. Transmission information for each of the modems 110 and 125 can be provided in the form of the transmission status messages sent from the message handlers 120 and 135 disposed in each respective modem.

In operation, the modem controller 115 can continually monitor each of the modems 110 and 125 to determine when each is active, or transmitting. In one arrangement, each of the modems 110 and 125 can send modem transmission messages to the modem controller 115 that indicate whether the modem that sent the message is transmitting or is not transmitting. For example, such messages can be sent each time the modem transitions from active to inactive or from inactive to active. The modem controller 115 can determine the time at which such messages are received from each respective modem and, accordingly, determine the amount of time that each modem transmits and whether such transmissions overlap.

The modem controller 115 can determine the amount of time that each of the modems 110 and 125 is active and the degree of overlap between such transmissions. The time periods measured for each modem can be weighted according to the type of each respective modem. For example, a CDMA modem may require more power than a Bluetooth modem. Accordingly, the CDMA modem likely transmits with more power, consumes more power, and generates more heat than a Bluetooth modem. This can be accounted for in the weighting factor. The weighting factors effectively allow the modem controller 115 to determine running totals of the transmission power used or expended by a given modem during a predetermined period of time. The transmit times can be updated and further adjusted by the weighting factors as the time period progresses. Further, the transmit times can be reset for each subsequent time period.

In one arrangement, the weighting factors can be stored within the communication device 100 in memory. The weighting factors can be stored within any of a variety of different data structures including, but not limited to, a table. The table can specify weighting factors for different modem types as well as for different modem types in different operating conditions. In another arrangement, weighting factors can be provided from one modem to another or to the controller from another modem. As noted, the weighting factor can be selected from a table by the providing entity or can be calculated and transmitted by the providing entity using a formula which accounts for various parameters and operating conditions to be described herein.

If the weighted time exceeds an established threshold, the modem controller 115 can implement one or more predetermined actions. The predetermined actions can be stored within memory of the communication device 100, for example in a table or other suitable data structure. These actions can include, but are not limited to, instructing one or more modems to stop transmitting for a specified amount of time or preventing one or more modems from transmitting for a specified amount of time. Instructions or commands for implementing the predetermined actions can be relayed from the modem controller 115 to the appropriate modem 110 and/or 125 via the corresponding message handler 120 or message handler 135.

As noted, the measurements performed by the modem controller 115 can be performed over one or more consecutive time periods of 30 minutes, 20 minutes, 10 minutes, or any other designated time period. The measurements can be reset for each new time period. Further detail regarding the time periods and the manner in which transmission times are tracked and weighted will be discussed herein in greater detail.

Figure 2:
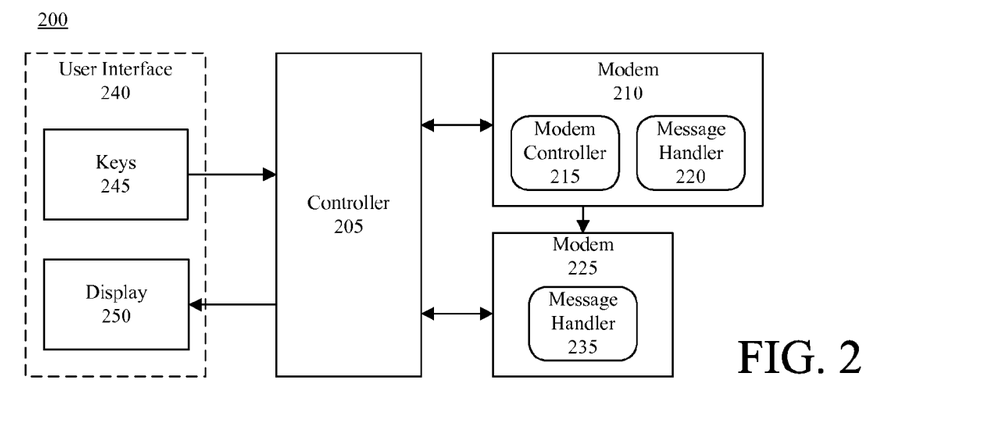
FIG. 2 depicts another communication device that is useful for understanding the present invention.

FIG. 2 depicts another communication device 200 that is useful for understanding the present invention. The communication device 200 is substantially similar to that described with reference to FIG. 1, with the exception that a modem controller 215 is disposed within the modem 210. Accordingly, the modem 210 can serve as a master and the modem 225 can function as a slave under the control of the modem 210.

The modem controller 215 can receive modem transmission messages from the message handler 235 of the modem 220. The modem controller 215 can perform effectively the same functions as described with reference to FIG. 1. For example, the modem controller 215 can provide instructions to the modem 210 as well as the modem 225. The instructions can be based upon various metrics or measurements made in the course of monitoring the operation of both of the modems 210 and 225. The operation of the modem 225 can be monitored via transmission status messages. Transmission information for the modem 210 can be made directly available to the modem controller 215.

Figure 3:
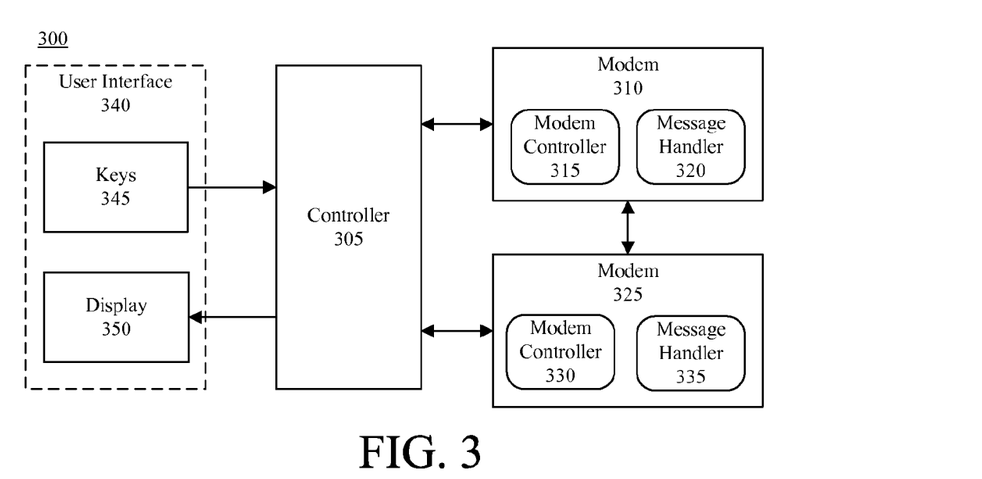
FIG. 3 depicts another communication device that is useful for understanding the present invention.

FIG. 3 depicts another communication device 300 that is useful for understanding the present invention. The communication device 300 can function similar to the communication device of FIG. 1, with the exception that each of the modems 310 and 325 can include a respective modem controller 315 and 330. In this embodiment, the modem 310 can send transmission status messages to the modem 325 via the message handler 320. Similarly, the modem 325 can send transmission status messages to the modem 310 via message the message handler 335.

Each of the modem controllers 315 and 320 can monitor the transmissions of the other modem and the modem within which the modem controller is located independently. In this case, the modem controller 315 only controls the modem 310 and the modem controller 330 controls only the modem 325. Thus, while the instructions provided from a given modem controller to the corresponding modem are dependent upon the operation of each modem within the communication device 300, each modem controller controls only the modem within which that modem controller is disposed.

In illustration, the modem controller 315 can be aware of the transmission activity of the modem 310. The modem controller 315 further can be aware of the transmission activity of the modem 325 via transmission status messages. The modem controller 315 can determine various metrics and, based upon the metrics, implement one or more predetermined actions that regulate the operation of the modem 310 independently of any predetermined actions that may be taken by the modem controller 330 in the modem 325.

Similarly, the modem controller 330 can be aware of the transmission activity of the modem 325. The modem controller 330 further can be aware of the transmission activity of the modem 310 via transmission status messages. The modem controller 330 can determine various metrics and, based upon the metrics, implement one or more predetermined actions that regulate the operation of the modem 325 independently of any predetermined actions that may be taken by the modem 310. While each of the modem controllers 315 and 330 can function independently, the predetermined actions can be coordinated. For example, while both of the modem controllers 315 and 330 can determine the same metric under the same conditions, the modem controller 315 can instruct the modem 310 to discontinue transmission while the modem controller 330 can allow transmission from the modem 325 to continue.

Figure 4:
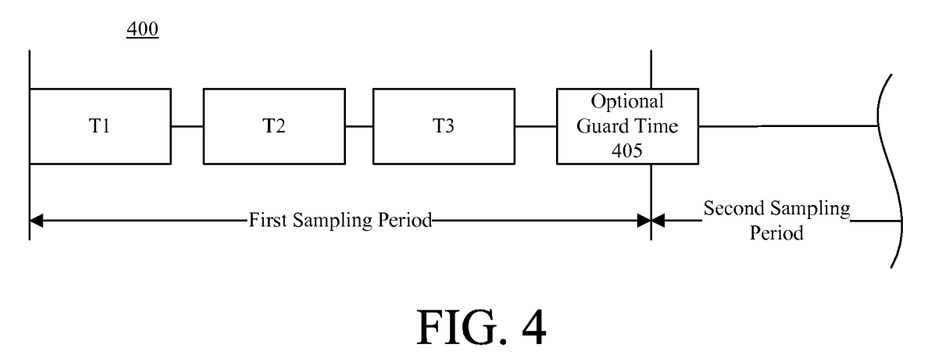
FIG. 4 is a timing diagram that is useful for understanding the present invention.

FIG. 4 is a timing diagram 400 that is useful for understanding the present invention. The timing diagram 400 illustrates transmission information that can be compiled by the modem controller described with reference to either of FIGS. 1, 2, and/or 3. The modem controller can collect transmission data for the various modems of the communication device over rolling time periods, denoted as "sampling periods" and shown in FIG. 4 as "First Sampling Period" and "Second Sampling Period".

From received transmission status messages, or directly from the modem within which the modem controller may be located, the modem controller can determine that each modem is concurrently transmitting during the time periods shown as T1, T2, and T3. In one arrangement, the modem controller can determine whether the transmission power of the communication device exceeds a threshold, or budget. If so, the modem controller can invoke one or more predetermined actions. In this case, the modem controller has imposed an optional guard time 405 during which transmission of one of the modems is prevented or, if both modems are currently active, transmission of one of the modems is discontinued. As shown, the first sampling period ends during the optional guard time 405 and the second sampling period begins immediately following the end of the first sampling period, which is also during the optional guard time 405.

It should be appreciated that in cases where more than two modems are included in the communication device, the various rules and preferences discussed herein can be adapted to such devices. For example, the predetermined actions can indicate that only one modem is to remain active, or that a total of two modems can remain active. Further, the predetermined actions can specify which modems are allowed to remain active and a priority, or order, for activating and deactivating the modems.

In one arrangement, the transmission power of the communication device can be determined by multiplying the time that each respective modem transmits concurrently with at least one other modem during the sample period by a proper weighting factor and then summing the results. Thus, if T1, T2, and T3 represent the duration of concurrent transmission by two or more modems of the communication device during the first sampling period, the measure of transmission power for the first modem can be determined from the expression "(T1+T2+T3)WF1", where WF1 is the weighting factor for modem 1. The measure of transmission power for modem 2 can be calculated according to the expression "(T1+T2+T3)WF2", where WF2 is the weighting factor for modem 2. The two expressions can be summed to determine the total transmission power for the communication device. This value can be compared with an established threshold or limit for the sampling period.

The weighting factor, as noted, can be dependent upon the type of modem that is transmitting. The weighting factor can serve as a proxy for the expected or measured transmission power of a given modem per unit of time thereby allowing the combination of transmission times and weighting factors to provide an estimate of the transmission power expended by each modem over a specified time period. The transmission power for each modem can be summed to determine an estimate of the transmission power generated by the communication device as a whole. For example, if a CDMA modem transmits for 30 seconds, the time can be multiplied by the weighting factor for a CDMA modem.

In another arrangement, the total amount of time that each modem transmits during a sampling period can be determined. The total amount of transmit time for each modem can be multiplied by the weighting factor for that modem and then summed. In this embodiment, the transmit power is indicative of the total transmission time for each modem rather than only for portions of the sampling period where two or more modems concurrently transmit signals.

The transmission power of a modem, and thus the weighting factor for each type of modem, can be determined based on any desired characteristics or parameters of the communication device, or any desired characteristics or parameters of systems, objects, or entities affected by the transmissions of the communication device. For example, the transmission power for the communication device can be determined based on a maximum desired temperature for one or more components of the communication device. The temperature of such components generally can be estimated by determining a temperature rise attributed to power losses in the communication device, including losses due to operation of a modem, and adding the temperature rise to an ambient temperature of the environment in which the communication device is operating. If the communication device is operated in a low temperature environment, a much greater temperature rise can be tolerated as opposed to operation in a high temperature environment.

By way of example, if the desired maximum temperature for a component, such as a shell of the communication device, is 45° C. and the ambient temperature is 15° C., a temperature rise of 30° C. can be allowed while still preventing the component from exceeding the desired maximum temperature. On the other hand, if the ambient temperature is 35° C., only a 10° C. temperature rise would be allowed. Thus, the desired transmission power for the communication device may vary depending on the circumstances in which the communication device is used, and can change as such circumstances change. Notwithstanding, the temperature of the communication device components typically will not change suddenly with a sudden change of ambient temperature. Accordingly, the temperature of the components can be monitored and transmission power adjustments can be implemented after one or more measured temperatures approach the desired maximum temperature.

In addition to, or in lieu of, maximum operating temperature, other parameters can be used to determine the transmission power for a modem and, thus, the weighting factor. For example, the transmission power can be determined based on the level of charge left in the battery of the communication device. In another arrangement, effects of RF energy transmitted by the communication device can be considered. For instance, a level of interaction with other electrical systems (i.e. electromagnetic interference), objects or entities can be considered. Such interaction is usually inversely related to the distance between the communication device and such systems, objects, or entities. Accordingly, such distances also can be considered when determining the maximum transmission power.

Figure 5:
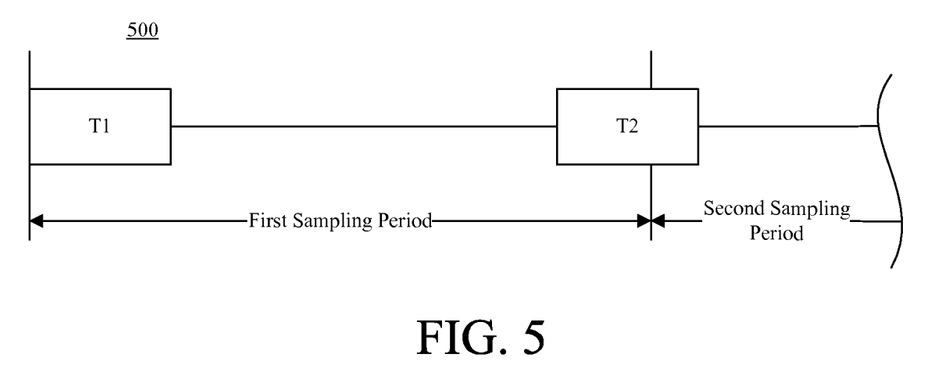
FIG. 5 is another timing diagram that is useful for understanding the present invention.

FIG. 5 is a timing diagram 500 that is useful for understanding the present invention. The timing diagram 500 illustrates the case where a time period T2 in which both modems transmit concurrently overlaps the end of the first sampling period and the beginning of the second sampling period. In that case, the time period T2 can be apportioned to each sampling period according to where the first sampling period ends and the second sampling period begins within the time period T2.

Figure 6:
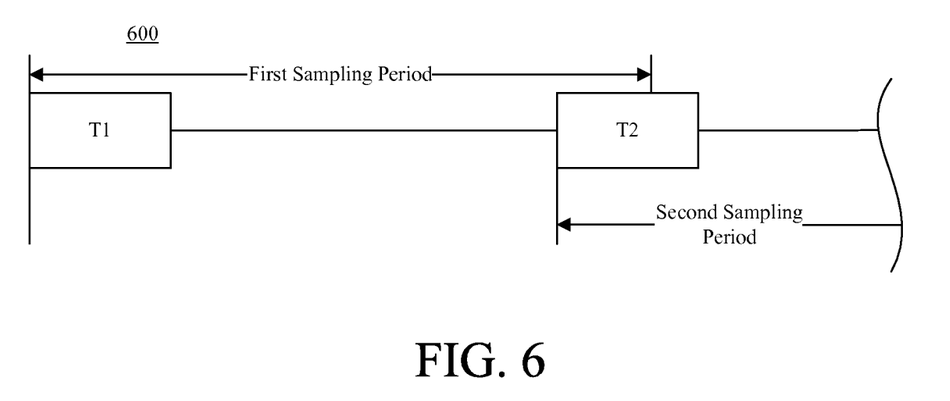
FIG. 6 is another timing diagram that is useful for understanding the present invention.

FIG. 6 is a timing diagram 600 that is useful for understanding the present invention. The timing diagram 600 illustrates the case where the modem controller has determined that although the first sampling period has not ended and both modems have begun to transmit concurrently as indicated by time period T2, the threshold will not be exceeded. In that case, the modem controller can begin a new sampling period, i.e., the second sampling period, at the beginning of time period T2 rather than waiting for the natural expiration of the first sampling period.

Accordingly, the beginning and end of the sampling periods can be varied according to conditions identified by the modem controller within the communication device if do desired. For example, if an optional guard time has been imposed that begins before the expiration of the first sampling period and ends after the beginning of the second sampling period, the beginning of the second sampling period can be delayed to coincide with the end of the guard time. Such can be the case since concurrent transmissions will not occur during the guard time. In this regard, it should be appreciated that the guard time can be a set amount of time or can be a variable amount of time that is set to the remaining length of the current sampling period.

Figure 7:
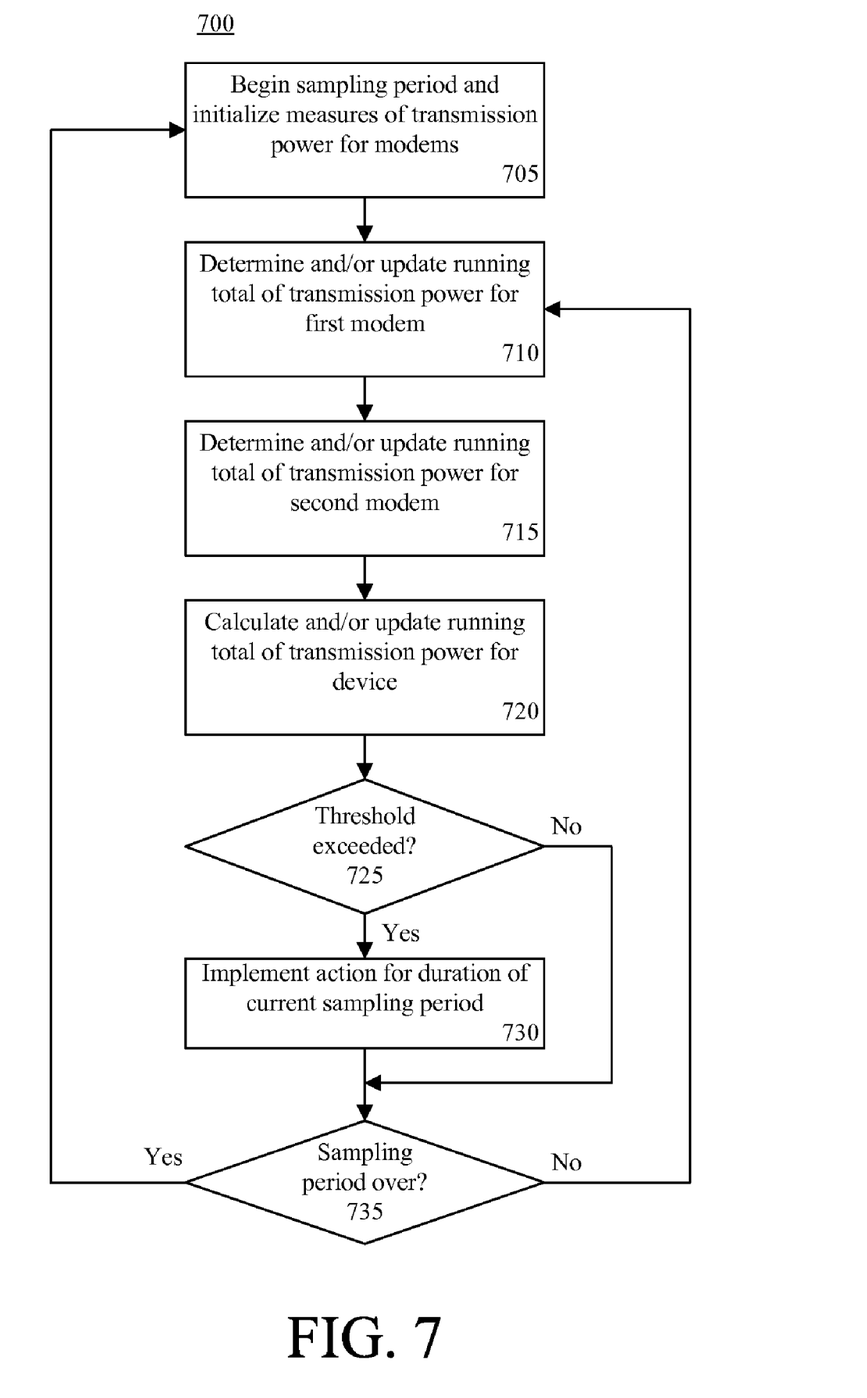
FIG. 7 is a flowchart presenting a method that is useful for understanding the present invention.

FIG. 7 is a flowchart 700 that is useful for understanding the present invention. The method 700 can be implemented in a communication device such as those described with reference to FIGS. 1-3. Accordingly, in step 705, a sampling period can begin as determined and measured by the modem controller(s). The measures of transmission power for each modem of the communication device can be initialized to a particular value such as zero. Alternatively, a baseline value can be used. It also should be appreciated that the measure of transmission power for each modem can be initialized to a different value according to the type of the modem if so desired.

In step 710, a running total of the transmission power for the first modem can be determined and/or updated. In one aspect, the total amount of time that the first modem has been transmitting thus far during the current sampling period can be calculated. The total amount of time can be multiplied by the weighting factor for the first modem to determine the running total of transmission power for the first modem thus far during the current sampling period.

In another arrangement, the total amount of time that the first modem has been transmitting concurrently with at least one other modem of the communication device thus far during the current sampling period can be determined. That amount of time can be multiplied by the weighting factor for the first modem to determine the running total of transmission power for the first modem thus far during the current sampling period.

In step 715, a running total of the transmission power for the second modem can be determined and/or updated. In one aspect, the total amount of time that the second modem has been transmitting thus far during the current sampling period can be identified. The total amount of time can be multiplied by the weighting factor for the second modem to determine the running total of transmission power for the second modem thus far during the current sampling period.

In another arrangement, the total amount of time that the second modem has been transmitting concurrently with at least one other modem of the communication device thus far during the current sampling period can be determined. That amount of time can be multiplied by the weighting factor for the second modem to determine the running total of transmission power for the second modem thus far during the current sampling period.

In step 720, the running total of transmission power for the entire communication device thus far during the current sampling period can be determined. The running total of transmission power for the communication device can be calculated by summing the running total of transmission power for the first modem with the running total of transmission power for the second, and/or any other modems.

In step 725, the modem controller can determine whether the running total of transmission power for the communication device exceeds an established threshold. The established threshold can vary according to the length of the sampling period. If the running total exceeds the threshold, the method can proceed to step 730. If not, the method can continue to step 735.

In step 730, in one arrangement, the modem controller can select a particular action or task from a table of such actions stored in memory. The table can specify different actions to be taken for each different type of modem as well as implementation rules. For example, the rules can specify priority for one modem over another such that if two modems are concurrently transmitting, the rules indicate which modem should be instructed to discontinue transmitting and which should be allowed to continue transmitting. Thus, a modem over which a telephone call is being conducted can continue to operate while another modem over which text messages are being sent can be instructed not to transmit. Similarly, the rules can indicate which modem should be prevented from starting to transmit.

In any case, the modem controller can implement the action for the remainder of the sampling period and then continue to step 735. For example, the modem controller can implement the optional guard time until the current sampling period expires. In another example, the modem controller can instruct a modem to stop transmitting and remain inactive until the expiration of the current sampling period. The modem controller further can prevent one or more other modems from transmitting until the expiration of the current sampling period. It should be appreciated that the modem controller further can continue the action beyond the current sampling period such as in the case when the guard time extends beyond the current sampling period and into the next sampling period.

Continuing with step 735, the modem controller can determine whether the current sampling period has expired or ended. If so, the method can proceed to step 705 where the measures of transmission power can be initialized and a new or subsequent sampling period can be started. If the current sampling period has not expired, the method can continue to step 710 to continue monitoring and/or updating the running totals of transmission power for each modem and the communication device.

The embodiments disclosed herein are directed to managing and coordinating the operation of multiple modems within a communication device. The time at which various modems in the communication device can transmit can be varied and managed according to one or more measures of transmission power for the modems in the communication device.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

This invention can be embodied in other forms without departing from the spirit or essential attributes thereof. Accordingly, reference should be made to the following claims, rather than to the foregoing specification, as indicating the scope of the invention.

What is claimed is:

1. Within a communication device, a method of managing a plurality of modems comprising:

determining a first measure of transmission power for a first modem, wherein the first measure of transmission power is a running total of transmission power for the first modem over a predetermined time period, wherein determining the first measure of transmission power comprises determining a total amount of time that the first modem transmits during the predetermined time period and calculating the first measure of transmission power by multiplying the total amount of transmit time for the first modem by a weighting factor that depends upon a type of the first modem, wherein the weighting factor accounts for a level of transmit power generated by the first modem;

determining a second measure of transmission power for a second modem, wherein the second measure of transmission power is a running total of transmission power for the second modem over the predetermined time period; and when a sum of the first measure of transmission power and the second measure of transmission power exceeds a threshold during the predetermined time period, performing at least one predetermined action.

2. The method of claim 1, further comprising calculating the sum of the first measure of transmission power and the second measure of transmission power only according to portions of the predetermined time period during which both the first modem and the second modem transmit concurrently.

3. The method of claim 1, wherein determining a total amount of time further comprises:

with a controller within the communication device, receiving from the first modem transmission status messages indicating when the first modem transmits; and calculating the time that the first modern transmits during the predetermined time period according to the transmission status messages.

4. The method of claim 1, wherein determining the second measure of transmission power further comprises:

determining a total amount of time that the second modem transmits during the predetermined time period; and calculating the second measure of transmission power by multiplying of the total amount of transmit time for the second modem by a weighting factor that depends upon a type of the second modem, wherein the weighting factor accounts for the level of transmit power generated by the second modem.

5. The method of claim 4, wherein determining a running total amount of time further comprises:

with a controller within the communication device, receiving from the second modem transmission status messages indicating when the second modem transmits; and
calculating the time that the second modem transmits during the predetermined time period according to the transmission status messages.

6. The method of claim 1, wherein performing at least one predetermined action further comprises discontinuing transmission of at least one of the first modem or the second modem until the expiration of the predetermined time period.

7. The method of claim 6, wherein discontinuing transmission of at least one of the first modem or the second modem further comprises selecting a modem for which transmission will he discontinued according to an established modem priority.

8. The method of claim 1, wherein performing at least one predetermined action further comprises preventing at least one of the first modem or the second modem from transmitting until the expiration of the predetermined time period.

9. A communication device comprising:
a plurality of modems; and
at least one controller coupled to the plurality of modems, wherein the at least one controller:
determines a first measure of transmission power for the first modem, wherein the first measure of transmission power is a running total of transmission power for the first modem over the predetermined time period, by determining a total amount of time that a first of the plurality of modems transmits during a predetermined time period and calculating the first measure of transmission power by multiplying the total amount of transmit time for the first modem by a weighting factor that depends upon a type of the first modem, wherein the weighting factor accounts for a level of transmit power generated by the first modem;
determines a second measure of transmission power for a second of the plurality of modems, wherein the second measure of transmission power running total of transmission power for the second modem over the predetermined time period; and
when a sum of the first measure of transmission power and the second measure of transmission power exceeds a threshold during the predetermined time period, performs at least one predetermined action.

10. The communication device of claim 9, wherein the at least one controller is disposed within one of the plurality of modems, wherein the modem comprising the controller functions as a master controller over the other ones of the plurality of modems.

11. The communication device of claim 9, wherein each of the plurality of modems comprises a respective controller, wherein each controller regulates only the modem within which that respective controller is disposed according to a running total of transmission power of the communication device that is independently determined by each respective controller with respect to the plurality of modems over the predetermined time period.

12. The communication device of claim 9, wherein the controller calculates the sum of the first measure of transmission power and the second measure of transmission power only for portions of the predetermined time period during which both the first modem and the second modem transmit concurrently.

13. The communication device of claim 9, wherein the controller calculates the second measure of transmission power by multiplying the running total amount of transmit time for the second modem by a weighting factor that depends upon modem type of the second modem, wherein the weighting factor accounts for the level of transmit power generated by the first modem.

14. The communication device of claim 9, wherein the controller selects a modem from the plurality of modems and allows the selected modem to transmit while preventing or discontinuing transmission of at least one other modem of the plurality of modems for the remainder of the predetermined time period.

15. A communication device comprising:
a first modem;
a second modem;
a first controller coupled to the first modem, wherein the first controller monitors the amount of time the first modem and the second modem concurrently transmit over a predetermined time period and determines a first measure of transmission power as a running total of transmission power for the first modem over the predetermined time period; and
a second controller disposed within the second modem, wherein the second controller independently monitors the amount of time the first modem and the second modem concurrently transmit over the redetermined time period and determines a second measure of transmission power as a running total of transmission power for the second modem over the predetermined time period;
wherein the first controller and the second controller coordinate to selectively prevent the first modem and the second modem from concurrently transmitting for the remainder of the predetermined time period when the sum of the first measure of transmission power and the second measure of transmission power exceeds the threshold.

16. The communication device of claim 15, wherein the first controller is disposed within the first-modem.

17. The communication device of claim 15, wherein the controller calculates the first measure of transmission power as a function of the total amount of time the first modem and the second modem concurrently transmit over the predetermined time period and a weighting factor that depends upon a type of the first modem.

\* \* \* \* \*